(12) United States Patent
Yamashita et al.

(10) Patent No.: US 7,614,735 B2
(45) Date of Patent: Nov. 10, 2009

(54) INK JET RECORDING METHOD AND INK JET RECORDING APPARATUS

(75) Inventors: Kunichi Yamashita, Kanagawa (JP); Ken Hashimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 272 days.

(21) Appl. No.: 11/878,916

(22) Filed: Jul. 27, 2007

(65) Prior Publication Data

US 2008/0036839 A1 Feb. 14, 2008

Related U.S. Application Data

(62) Division of application No. 10/943,163, filed on Sep. 17, 2004, now Pat. No. 7,488,063.

(30) Foreign Application Priority Data

Mar. 17, 2004 (JP) ............................. 2004-76795

(51) Int. Cl.
 *C09D 11/00* (2006.01)
(52) U.S. Cl. ................................ 347/100; 106/31.13
(58) Field of Classification Search .................. 347/100; 106/31.13
 See application file for complete search history.

(56) References Cited

U.S. PATENT DOCUMENTS

| | | | |
|---|---|---|---|
| 6,050,676 A * | 4/2000 | Sugimoto et al. | ........... 347/100 |
| 6,267,476 B1 | 7/2001 | Kato et al. | |
| 6,467,891 B2 | 10/2002 | Moriyama et al. | |
| 2003/0067525 A1 | 4/2003 | Goto et al. | |
| 2003/0151643 A1 | 8/2003 | Doi | |
| 2004/0001211 A1 | 1/2004 | Ogasawara et al. | |
| 2004/0095440 A1 * | 5/2004 | Pinard | ........................ 347/74 |

FOREIGN PATENT DOCUMENTS

| | | |
|---|---|---|
| JP | A-6-106735 | 4/1994 |
| JP | A-8-281933 | 10/1996 |
| JP | A-11-207999 | 8/1999 |

* cited by examiner

*Primary Examiner*—Stephen D Meier
*Assistant Examiner*—Laura E Martin
(74) *Attorney, Agent, or Firm*—Morgan, Lewis & Bockius LLP

(57) ABSTRACT

An ink jet recording method utilizing an ink set for ink jet recording which includes at least two types of liquids including an ink that contains at least a colorant, and a liquid composition that contains at least a component for aggregating and/or thickening the ink. The relation represented by the following formula (1) is satisfied:

$$b_2/a_2 < b_1/a_1 \qquad \text{Formula (1)}$$

wherein $a_1$ and $b_1$ represent the respective amounts of the ink and the liquid composition applied per unit area, when the ink is applied to the recording material before the liquid composition is applied; $a_2$ and $b_2$ represent the respective amounts of the ink and the liquid composition applied per unit area, when the liquid composition is applied to the recording material before the ink is applied; and $a_1$ and $b_1$ satisfy the relation $a_1 > b_1$ and $a_2$ and $b_2$ satisfy the relation $a_2 > b_2$.

8 Claims, No Drawings

INK JET RECORDING METHOD AND INK JET RECORDING APPARATUS

CROSS-REFERENCE TO RELATED APPLICATION

The present application is a divisional application of U.S. application Ser. No. 10/943,163, filed Sep. 17, 2004 now U.S. Pat. No. 7,488,063, which claims the benefit of Japanese Application No. 2004-76795, filed Mar. 17, 2004, both of which are incorporated herein by reference in their entirety.

BACKGROUND OF THE INVENTION

1. Field of the Invention

The present invention relates to an ink jet recording method and an ink jet recording apparatus using the same.

2. Description of the Related Art

Ink jet-type recording systems or apparatuses, in which liquid ink or melted solid ink is discharged from nozzles, slits, porous film, or the like and deposited on material such as paper, cloth, or film for recording, have various advantages including being designable in a small size at low cost and operate with only very low noise. Recently, commercially available ink jet-type recording apparatuses have included not only monochrome (black) printers, which can produce high-quality print on regular paper such as writing paper or copy paper, but also many types of full-color recording products. Thus, ink jet-type recording apparatuses have come to occupy a significant position in the field of recording apparatuses. In particular, piezo-ink jet recording systems using a piezo-electric device or thermal-ink jet recording systems in which droplets are formed by the action of thermal energy for recording have many advantages including being able to perform high-speed printing with high resolution.

The ink used in ink jet recording apparatuses is mainly composed of a solvent, a colorant, and additives. It is required for this ink to have the following characteristics: (1) the ink should produce uniform images with high resolution and high density without loss of color-edge definition on paper (on the recording material); (2) the ink should have good quick-drying properties on paper; (3) the ink should produce images with good fastness properties; and (4) the ink should have good storage stability over a prolonged period. In addition, high-speed, high image-quality office ink jet printers have been commercially available in recent years, with importance being attached to a double-sided printing function, and a characteristic of being able to reduce or control curling or cockling of the recording medium is required, which can be significant especially when regular paper is used.

For example, Japanese Patent Application Laid-Open (JP-A) No. 6-106735 discloses a method for improving image quality and drying properties, which includes using a reaction between black ink and a reactive color ink or a reactive liquid. When a black portion of an image is formed with this method, however, the sequence of black ink printing and color ink or reactive liquid printing is changed during the process of bidirectional batch printing. Therefore, for, example, mottling (grainy unevenness) may occur when the color ink or the reactive liquid is applied first, so that images may show differences between printing done in one direction and that done in the opposite direction.

As another example, JP-A No. 11-207999 discloses a method which includes applying a first amount of ink and then a second amount of ink in the process of bidirectional printing, wherein the second amount is more than the first amount so that a secondary color difference between both directions can be reduced. However, this method, in which the first amount of ink is less than the second amount of ink, is basically different from the previously described method using a reaction system for improving the quality of a bidirectionally printed image.

As a further example, JP-A No. 08-281933 discloses a method which includes forming an image by overlaying color ink with a printability improving liquid and then color ink in this order so that any color tone difference can be reduced in the process of bidirectional printing. However, this method requires two types of color ink heads or that multi-pass printing be performed, and thus is disadvantageous in view of such considerations as cost and print speed.

SUMMARY OF THE INVENTION

The present invention has been made in view of the above-described circumstances and provides an ink jet recording method and an ink jet recording apparatus, which can be prevented from causing an image difference or a drying time difference in the process of bidirectional printing particularly in an ink jet recording system in which a printing head moves or "scans" back and forth to form an image.

A first aspect of the invention is to provide an ink jet recording method utilizing an ink set for ink jet recording which comprises at least two types of liquids including an ink that comprises at least a colorant, and a liquid composition that comprises at least a component for aggregating and/or thickening the ink. The method comprises applying the ink and the liquid composition to a recording material to bring the ink and the liquid composition into contact with each other whereby an image is formed. Here, the relation represented by the following formula (1) is satisfied:

$$b_2/a_2 < b_1/a_1 \qquad \text{Formula (1)}$$

wherein $a_1$ and $b_1$ represent the respective amounts of the ink and the liquid composition applied per unit area, when the ink is applied to the recording material before the liquid composition is applied; $a_2$ and $b_2$ represent the respective amounts of the ink and the liquid composition applied per unit area, when the liquid composition is applied to the recording material before the ink is applied; and $a_1$ and $b_1$ satisfy the relation $a_1 > b_1$ and $a_2$ and $b_2$ satisfy the relation $a_2 > b_2$.

A second aspect of the invention is to provide an ink jet recording method utilizing an ink set for ink jet recording which comprises at least two types of liquids including an ink that comprises at least a colorant, and a liquid composition that comprises at least a component for aggregating and/or thickening the ink. The method comprises applying the ink and the liquid composition to a recording material to bring the ink and the liquid composition into contact with each other whereby an image is formed. Here, the relation represented by the following formula (2) is satisfied:

$$b_{d2}/a_{d2} < b_{d1}/a_{d1} \qquad \text{Formula (2)}$$

wherein $a_{d1}$ and $b_{d1}$ represent the respective amounts of the ink and the liquid composition applied per one drop, when the ink is applied to the recording material before the liquid composition is applied; $a_{d2}$ and $b_{d2}$ represent the respective amounts of the ink and the liquid composition applied per one drop, when the liquid composition is applied to the recording material before the ink is applied; and $a_{d1}$ and $b_{d1}$ satisfy the relation $a_{d1} > b_{d1}$ and $a_{d2}$ and $b_{d2}$ satisfy the relation $a_{d2} > b_{d2}$.

A third aspect of the invention is to provide an ink jet recording apparatus comprising a recording head for discharging liquids of an ink set for ink jet recording. The ink set comprises at least two types of liquids including an ink that comprises at least a colorant, and a liquid composition that comprises at least a component for aggregating and/or thickening the ink. The apparatus applies the ink and the liquid composition to a recording material to bring the ink and the liquid composition into contact with each other whereby an image is formed. Here, the relation represented by the following formula (1) is satisfied:

$$b_2/a_2 < b_1/a_1 \quad \text{Formula (1)}$$

wherein $a_1$ and $b_1$ represent the respective amounts of the ink and the liquid composition applied per unit area, when the ink is applied to the recording material before the liquid composition is applied; $a_2$ and $b_2$ represent the respective amounts of the ink and the liquid composition applied per unit area, when the liquid composition is applied to the recording material before the ink is applied; and $a_1$ and $b_1$ satisfy the relation $a_1 > b_1$ and $a_2$ and $b_2$ satisfy the relation $a_2 > b_2$.

A fourth aspect of the invention is to provide an ink jet recording apparatus comprising a recording head for discharging liquids of an ink set for ink jet recording. The ink set comprises at least two types of liquids including an ink that comprises at least a colorant, and a liquid composition that comprises at least a component for aggregating and/or thickening the ink. The apparatus applies the ink and the liquid composition to a recording material to bring the ink and the liquid composition into contact with each other whereby an image is formed. Here, the relation represented by the following formula (2) is satisfied:

$$b_{d2}/a_{d2} < b_{d1}/a_{d1} \quad \text{Formula (2)}$$

wherein $a_{d1}$ and $b_{d1}$ represent the respective amounts of the ink and the liquid composition applied per one drop, when the ink is applied to the recording material before the liquid composition is applied; $a_{d2}$ and $b_{d2}$ represent the respective amounts of the ink and the liquid composition applied per one drop, when the liquid composition is applied to the recording material before the ink is applied; and $a_{d1}$ and $b_{d1}$ satisfy the relation $a_{d1} > b_{d1}$ and $a_{d2}$ and $b_{d2}$ satisfy the relation $a_{d2} > b_{d2}$.

According to the present invention, an ink jet recording method and an ink jet recording apparatus are provided which are capable of preventing image variation or drying time variation from occurring in the process of bidirectional printing, particularly in an ink jet recording system in which a printing head moves laterally back and forth to form an image.

DETAILED DESCRIPTION OF THE INVENTION

The present invention is described in detail below.

<Ink jet Recording Method>

The ink jet recording method of the present invention utilizes an ink set for ink jet recording which comprises at least two types of liquids including an ink that comprises at least a colorant, and a liquid composition that comprises at least a component for aggregating and/or thickening the ink. The ink jet recording method comprises applying the ink and the liquid composition to a recording material to bring the ink and the liquid composition into contact with each other whereby an image is formed. In this method, the relation represented by formula (1): $b_2/a_2 < b_1/a_1$ is satisfied. In formula (1), $a_1$ and $b_1$ represent the respective amounts of the ink and the liquid composition applied per unit area, when the ink is applied to the recording material before the liquid composition is applied; $a_2$ and $b_2$ represent the respective amounts of the ink and the liquid composition applied per unit area, when the liquid composition is applied to the recording material before the ink is applied; and $a_1$ and $b_1$ satisfy the relation $a_1 > b_1$, and $a_2$ and $b_2$ satisfy the relation $a_2 > b_2$.

In the invention, as described below, the ink containing at least a colorant and the liquid composition containing at least a component for aggregating and/or thickening the ink are in contact with each other to form an image. The use of this method improves image quality, image uniformity or loss of color-edge definition resistance between colors as compared with a conventional ink set for recording.

The two liquids are in contact with each other so that the ink is aggregated and/or that a liquid mixture is thickened at an interface part between the two liquids. In this case, such a process should occur quickly and efficiently.

Herein, the aggregation according to the invention is defined as that a liter of a mixture of one part by mass of the ink and one part by mass of the liquid composition forms a state that contains at least $1 \times 10^{10}$ particles having diameters of 0.5 μm or more and at least $1 \times 10^8$ particles having diameters of 5 μm or more.

The number of the particles each having a diameter within the above range may be measured using Accusizer™ 770 Optical Particle Sizer (manufactured by Particle Sizing System). The measurement is performed according to a prescribed method including the steps of taking 2 μl of an aqueous ink jet recording liquid and placing it in a measurement cell. In the measurement, the density of the colorant is input as a density parameter of dispersed particles. In the measurement system, particles passing through the measurement part are detected using an optical technique.

The thickening according to the invention can be defined as that a mixture of one part by mass of the ink and one part by mass of the liquid composition forms a state that satisfies the relation represented by the following formula (3):

$$\eta_{a+b}/(\eta_a + \eta_b) > 1 \quad \text{Formula (3)}$$

wherein $\eta_{a+b}$ represents the viscosity of the mixture; $\eta_a$ represents the viscosity of the ink; and $\eta_b$ represents the viscosity of the liquid composition.

The viscosity (including the viscosity as shown later) is measured using a rotational viscometer Rheomat 115 (manufactured by Contraves) under the conditions of 23° C. and a shearing speed of $1400 \text{ s}^{-1}$.

For example, when an image is formed by bidirectional printing with a black ink (the ink) and a reactive color ink or a reactive liquid (the liquid composition) in an ink jet recording system, the reactive color ink or the reactive liquid may be applied first to paper (a recording material) (first application). In such a case, the black ink is applied to the surface of the paper sheet which is already wetted with the reactive color ink or the reactive liquid, and thus while the penetration can be fast, unevenness in paper-wetting with the reactive color ink applied first can cause local unevenness of the aggregation and penetration of the black ink on the surface of the paper sheet so that image unevenness (mottling) can be significant.

The reactive color ink or the reactive liquid may be applied later to a sheet of paper (later application). In such a case, the reactive color ink or the reactive liquid is mixed and uniformly aggregated and allowed to penetrate under the condition that the black ink is placed on the surface of the paper sheet, and thus it has been found that while image unevenness can hardly occur, the penetration rate has to be relatively low.

As a result, the present inventors have found that image unevenness and drying properties can be improved by controlling the amount of the liquid composition application depending on the timing of the application of the liquid composition to the recording material in the ink jet recording with the ink and the liquid composition for aggregating and/or thickening the ink in a printing system in which a printing head moves both in one direction and in the opposite direction, and have finally completed the invention.

Specifically, when the reactive color ink or the reactive liquid is applied first, the amount of the applied reactive color ink or liquid is reduced so that an optimal balance can be achieved between the aggregation and the penetration and that images can be assured without a change in the penetration rate. On the other hand, when the reactive color ink or the reactive liquid is applied later, the amount of the applied reactive color ink or liquid is increased so that the penetration rate can be increased and that images can be assured.

Thus, it has been found that the image difference or the drying time difference in the process of bidirectionally printing a black image part can be improved by controlling the ratio between the reactive color ink or liquid printing and the black ink printing depending on the order of the application.

More specifically, when the ink and the liquid composition are in contact with each other on the recording material to form an image, the relation represented by the following formula (1) below is required to be satisfied.

$$b_2/a_2 < b_1/a_1 \quad \text{Formula (1)}$$

In formula (1), $a_1$ and $b_1$ represent the respective amounts of the ink and the liquid composition applied per unit area, when the ink is applied to the recording material before the liquid composition is applied; and $a_2$ and $b_2$ represent the respective amounts of the ink and the liquid composition applied per unit area, when the liquid composition is applied to the recording material before the ink is applied.

In formula (1), $a_1$ and $b_1$ satisfy the relation $a_1 > b_1$, and $a_2$ and $b_2$ satisfy the relation $a_2 > b_2$. The amount applied per unit area is defined as the mass (g) of ink applied per 1 $m^2$.

In the invention, $a_1$ is preferably in a range of 4 to 30 $g/m^2$, $b_1$ is preferably in a range of 2 to 20 $g/m^2$, $a_2$ is preferably in a range of 4 to 30 $g/m^2$, and $b_2$ is preferably in a range of 2 to 20 $g/m^2$.

In formula (1), $b_1/a_1$ and $b_2/a_2$ are each preferably in a range of 0.1 to 1.0, more preferably 0.1 to 0.8, and still more preferably 0.2 to 0.5. If $b_1/a_1$ or $b_2/a_2$ is less than 0.1, the image may have a low optical density. If $b_1/a_1$ or $b_2/a_2$ exceeds 1.0, curling and cockling may easily occur.

In such a system as the piezo-ink jet recording system, in which the printing can be performed with variable drop amounts, the relation represented by the following formula (2) below is required to be satisfied, when the image is formed.

$$b_{d2}/a_{d2} < b_{d1}/a_{d1} \quad \text{Formula (2)}$$

In formula (2), $a_{d1}$ and $b_{d1}$ represent the respective amounts of the ink and the liquid composition applied per one drop, when the ink is applied to the recording material before the liquid composition is applied; and $a_{d2}$ and $b_{d2}$ represent the respective amounts of the ink and the liquid composition applied per one drop, when the liquid composition is applied to the recording material before the ink is applied.

In formula (2), $a_{d1}$ and $b_{d1}$ satisfy the relation $a_{d1} > b_{d1}$, and $a_{d2}$ and $b_{d2}$ satisfy the relation $a_{d2} > b_{d2}$. The amount applied per one drop can be defined as the mass (ng) of one drop of the liquid.

In the invention, $a_{d1}$ is preferably in a range of 0.5 to 80 ng, $b_{d1}$ is preferably in a range of 0.2 to 40 ng, $a_{d2}$ is preferably in a range of 0.5 to 80 ng, and $b_{d2}$ is preferably in a range of 0.2 to 40 ng.

In formula (2), $b_{d1}/a_{d1}$ and $b_{d2}/a_{d2}$ are each preferably in a range of 0.1 to 1.0, more preferably 0.1 to 0.8, and still more preferably 0.2 to 0.5. If $b_{d1}/a_{d1}$ or $b_{d2}/a_{d2}$ is less than 0.1, the image may have a low optical density. If $b_{d1}/a_{d1}$ or $b_{d2}/a_{d2}$ is more than 1.0, curling or cockling may easily occur.

As described above, coverage control by varying the amount of the drop can provide more uniform distribution of ink for images than coverage control by thinning-out type printing and thus can produce higher image quality as compared with the case that the amount of ink applied per unit area is defined by thinning-out pattern according to image processing.

(Ink)

In the invention, the ink contains at least a colorant and optionally contains water, a water-soluble organic solvent, a surfactant, and the like and may contain any other component if necessary.

The colorant used for the ink may be any of a dye and a pigment. However, the colorant particularly preferably includes at least one pigment, because pigments can be more likely to cause aggregation than dyes, when mixed with the liquid composition. In particular, carbon black can often meet the commercial demand for recording devices or methods, because black images have been heavily used to form characters in offices in recent years and thus highly demanded and because the carbon black can be used as a black pigment to form a highly water- or light-resisting black ink. The pigment is preferably dispersed with a polymer dispersant, self-dispersible or coated with a resin.

The pigment used in the invention may be any of an organic pigment and an inorganic pigment. Examples of black pigments include carbon black pigments such as furnace black, lamp black, acetylene black, and channel black. Applicable pigments include not only black pigments and pigments of the three primary colors, cyan, magenta and yellow but also pigments of a specific color such as red, green, blue, brown, and white, metallic luster pigments such as gold pigments and silver pigments, and colorless or light-color extender pigments, and plastic pigments. Also applicable are particles that comprise a core of silica, alumina, a polymer bead, or the like and a dye or pigment fixed on the surface of the core; insoluble lake compounds of dyes; colored emulsions; and colored latex. A novel pigment may also be synthesized for use in the invention.

Specific examples of the pigment include, but are not limited to, Raven 7000, Raven 5750, Raven 5250, Raven 5000 ULTRA II, Raven 3500, Raven 2500 ULTRA, Raven 2000, Raven 1500, Raven 1255, Raven 1250, Raven 1200, Raven 1190 ULTRA II, Raven 1170, Raven 1080 ULTRA, Raven 1060 ULTRA, Raven 790 ULTRA, Raven 780 ULTRA, and Raven 760 ULTRA (each manufactured by Colombian Carbon Company); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (each manufactured by Cabot Corporation); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (each manufactured by Degussa AG); and No. 25, No. 33, No. 40, No. 47, No. 52, No. 900, No. 2300, MCF-88, MA600, MA7, MA8, and MA100 (each manufactured by Mitsubishi Chemical Co., Ltd.). The black pigment may also be fine particles of a magnetic material such as magnetite and ferrite or titanium black.

A pigment that is self-dispersible in water may be used in the invention. Such a pigment includes a pigment that has many water-solubilizing groups on its surface and is stably dispersible in water in the absence of any polymer dispersant. Specifically, the pigment self-dispersible in water is produced by subjecting a common pigment to a surface modification treatment such as acid/base treatment, coupling agent treatment, polymer grafting, plasma treatment, and oxidation/reduction treatment.

Applicable examples of the pigment self-dispersible in water include pigments produced by subjecting any of the above pigments to the surface modification treatment; Cab-o-jet-200, Cab-o-jet-250, Cab-o-jet-260, Cab-o-jet-270, Cab-o-jet-300, IJX-444, and IJX-55 each manufactured by Cabot Corporation; Microjet Black CW-1 and CW-2 each manufactured by Orient Chemical Industries, Ltd.; and commercially available self-dispersible pigments such as those commercially available from Nippon Shokubai Co., Ltd.

The cyan pigment may be, but not limited to, C.I. Pigment Blue-1, -2, -3, -15, -15:1, -15:2, -15:3, -15:4, -16, -22, or -60.

The magenta pigment may be, but not limited to, C.I. Pigment Red-5, -7, -12, -48, -48:1, -57, -112, -122, -123, -146, -168, -184, or -202.

The yellow pigment may be, but not limited to, C.I. Pigment Yellow-1, -2, -3, -12, -13, -14, -16, -17, -73, -74, -75, -83, -93, -95, -97, -98, -114, -128, -129, -138, -151, -154, or -180.

A so-called capsule dye or pigment may also be used in which each colorant is encapsulated with any of various resins.

On the other hand, the dye used in the invention may be any of a water-soluble dye and a disperse dye.

Specific examples of the water-soluble dyer include C.I. Direct Black -2, -4, -9, -11, -17, -19, -22, -32, -80, -151, -154, -168, -171, -194, and -195; C.I. Direct Blue-1, -2, -6, -8, -22, -34, -70, -71, -76, -78, -86, -112, -142, -165, -199, -200, -201, -202, -203, -207, -218, -236, -287, and -307; C.I. Direct Red-1, -2, -4, -8, -9, -11, -13, -15, -20, -28, -31, -33, -37, -39, -51, -59, -62, -63, -73, -75, -80, -81, -83, -87, -90, -94, -95, -99, -101, -110, -189, and -227; C.I. Direct Yellow-1, -2, -4, -8, -11, -12, -26, -27, -28, -33, -34, -41, -44, -48, -58, -86, -87, -88, -132, -135, -142, -144, and -173; C.I. Food Black-1 and -2; C.I. Acid Black-1, -2, -7, -16, -24, -26, -28, -31, -48, -52, -63, -107, -112, -118, -119, -121, -156, -172, -194, and -208; C.I. Acid Blue-1, -7, -9, -15, -22, -.23, -27, -29, -40, -43, -55, -59, -62, -78, -80, -81, -83, -90, -102, -104, -111, -185, -249, and -254; C.I. Acid Red-1, -4, -8, -13, -14, -15, -18, -21, -26, -35, -37, -52, -110, -144, -180, -249, -257, and -289; and C.I. Acid Yellow-1, -3, -4, -7, -11, -12, -13, -14, -18, -19, -23, -25, -34, -38, -41, -42, -44, -53, -55, -61, -71, -76, -78, -79, and -122.

Specific examples of the disperse dye include C.I. Disperse Yellow-3, -5, -7, -8, -42, -54, -64, -79, -82, -83, -93, -100, -119, -122, -126, -160, -184:1, -186, -198, -204, and -224; C.I. Disperse Orange-13, -29, -31:1, -33, -49, -54, -66, -73, -119, and -163; C.I. Disperse Red-1, -4, -11, -17, -19, -54, -60, -72, -73, -86, -92, -93, -126, -127, -135, -145, -154, -164, -167:1, -177, -181, -207, -239, -240, -258, -278, -283, -311, -343, -348, -356, and -362; C.I. Disperse Violet-33; C.I. Disperse Blue-14, -26, -56, -60, -73, -87, -128, -143, -154, -165, -165:1, -176, -183, -185, -201, -214, -224, -257, -287, -354, -365, and -368; and C.I. Disperse Green-6:1 and -9.

The colorant used in the invention is preferably contained in an amount of 1 to 15% by mass, more preferably of 2 to 10% by mass based on the total mass of the ink. If the content of the colorant in the liquid is less than 1% by mass, the resulting optical density can sometimes be insufficient. If the content of the colorant is more than 15% by mass, the liquid jet properties can sometimes be unstable.

In the invention, a water-soluble organic solvent is preferably used as a material for increasing the moisture retention of the ink and controlling the liquid viscosity. Examples of the water-soluble organic solvent include, but are not limited to, polyhydric alcohols such as ethylene glycol, diethylene glycol, propylene glycol, polypropylene glycol, butylene glycol, triethylene glycol, 1,5-pentanediol, 1,2,6-hexanetriol, and glycerol; nitrogen-containing solvents such as pyrrolidone, N-methyl-2-pyrrolidone, cyclohexyl pyrrolidone, and triethanolamine; alcohols such as ethanol, isopropyl alcohol, butyl alcohol, and benzyl alcohol; sulfur-containing solvents such as thiodiethanol, thiodiglycerol, sulfolane, and dimethyl sulfoxide; propylene carbonate; and ethylene carbonate.

In the invention, one or more water-soluble organic solvents may be used alone or in combination. The water-soluble organic solvent is preferably contained in an amount of 1 to 60% by mass, more preferably of 5 to 40% by mass based on the total mass of the ink.

The ink generally contains water, which may be ion exchange water, distilled water, pure ware, ultra-pure water, or the like.

The content of the water in the ink is preferably from 20 to 80% by mass, and particularly preferably from 30 to 60% by mass. If the content of the water is less than 20% by mass, the discharge stability can sometimes be reduced or normal discharge cannot sometimes be achieved. If the content of the water is more than 80% by mass, the ink can sometimes be inferior in long-term storage stability.

The viscosity of the liquid ink is preferably from 1 to 8 mPa·s. If the viscosity is lower than 1 mPa·s, thickening can be insufficient on the recorded material so that the image quality effect cannot sometimes be produced, and the discharge stability or the like can be sometimes degraded. If the viscosity is higher than 8 mPa·s, the discharge stability can be insufficient so that image dropouts or thin spots can sometimes occur.

The liquid viscosity may be measured by the above method.

The ink may also contain a water-soluble resin for the purpose of amplifying the effect of improving image density, loss of color-edge definition resistance, loss of color-edge definition resistance between colors, or image uniformity or for the purpose of controlling clogging, discharge response or stability, or storage stability. Specifically, it has been found that the image-improving effect is significant when the ink contains such a water-soluble resin. This is presumably because the added water-soluble resin can assist the production of the network between the colorant molecules so that a three-dimensional structure can easily be formed in the liquid to enhance or amplify thickening in the liquid mixture and to produce the image quality effect. When the water-soluble resin is added, the network structure can also be maintained on the recorded material even after images are formed, so that the resulting images can have good fixing properties or good resistance to abrasion.

A compound having a hydrophilic structure moiety and a hydrophobic structure moiety, or the like can effectively be used as the water-soluble resin. Examples of such a compound include a condensation polymer and an addition polymer. For example, the condensation polymer may be a polyester polymer, while the addition polymer may be a polymer of a monomer having an α,β-ethylenically unsaturated group. For example, the addition polymer may also be a copolymer of an appropriate combination of a monomer having an α,β-ethylenically unsaturated group with a hydrophilic group and a monomer having an α,β-ethylenically unsaturated group with a hydrophobic group. Also applicable is a homopolymer of a monomer having an α,β-ethylenically unsaturated group with a hydrophilic group.

Examples of the monomer having an α,β-ethylenically unsaturated group with a hydrophilic group include monomers having a carboxyl group, a sulfonic acid group, a hydroxyl group, or a phosphoric acid group, such as acrylic acid, methacrylic acid, crotonic acid, itaconic acid, itaconic acid monoester, maleic acid, maleic acid monoester, fumaric acid, fumaric acid monoester, vinylsulfonic acid, styrenesulfonic acid, sulfonated vinylnaphthalene, vinyl alcohol, acrylamide, methacryloxyethyl phosphate, bismethacryloxyethyl phosphate, methacryloxyethylphenyl acid phosphate, ethylene glycol dimethacrylate, and diethylene glycol dimethacrylate.

Examples of the monomer having an α,β-ethylenically unsaturated group with a hydrophobic group include styrene, styrene derivatives such as α-methylstyrene and vinyltoluene, vinylcyclohexane, vinylnaphthalene, vinylnaphthalene derivatives, alkyl acrylates, phenyl acrylate, alkyl methacrylates, phenyl methacrylate, cycloalkyl methacrylates, alkyl crotonates, dialkyl itaconates, and dialkyl maleates.

The copolymer of the monomers having the hydrophilic group and the hydrophobic group, respectively, may be any of random, block and graft copolymers.

Preferred examples of the copolymer include styrene-styrenesulfonic acid copolymer, styrene-maleic acid copolymer, styrene-methacrylic acid copolymer, styrene-acrylic acid copolymer, vinylnaphthalene-maleic acid copolymer, vinylnaphthalene-methacrylic acid copolymer, vinylnaphthalene-acrylic acid copolymer, alkyl acrylate-acrylic acid copolymer, alkyl methacrylate-methacrylic acid copolymer, styrene-alkyl methacrylate-methacrylic acid copolymer, styrene-alkyl acrylate-acrylic acid copolymer, styrene-phenyl methacrylate-methacrylic acid copolymer, and styrene-cyclohexyl methacrylate-methacrylic acid copolymer.

Any of these copolymers can further be copolymerized with a monomer having a polyoxyethylene group or a hydroxyl group as needed. For the purposes of enhancing the affinity for a pigment having an acid functional group on its surface and improving the dispersion stability, a monomer having a cationic functional group may appropriately be copolymerized, such as N,N-dimethylaminoethyl methacrylate, N,N-dimethylaminoethyl acrylate, N,N-dimethylaminomethacrylamide, N,N-dimethylaminoacrylamide, N-vinylpyrrole, N-vinylpyridine, N-vinylpyrrolidone, and N-vinylimidazole.

Also effective are polystyrenesulfonic acid, polyacrylic acid, polymethacrylic acid, polyvinylsulfonic acid, polyalginic acid, polyoxyethylene-polyoxypropylene-polyoxyethylene block copolymer, a formalin condensate of naphthalenesulfonic acid, polyvinylpyrrolidone, polyethyleneimine, polyamines, polyamides, polyvinylimidazoline, aminoalkyl acrylate-acrylamide copolymer, chitosan, polyoxyethylene alkyl ether, polyoxyethylene alkyl phenyl ether, polyoxyethylene fatty acid amide, polyvinyl alcohol, polyacrylamide, cellulose derivatives such as carboxymethylcellulose and carboxyethylcellulose, and polysaccharides and derivatives thereof.

The hydrophilic group of the water-soluble resin is preferably, but not limited to, a carboxylic acid or a carboxylic acid salt. This is presumably because the degree of the colorant aggregation on the recorded material can be moderate when the carboxylic acid is specifically used as the hydrophilic group.

The water-soluble resin of a copolymer with a hydrophilic acid group is preferably used in the form of a salt with a basic compound or material so as to have a higher water-solubility.

The material or compound for forming the salt with the polymer may be an alkali metal such as sodium, potassium and lithium; an aliphatic amine such as monomethylamine, dimethylamine and triethylamine; an alcohol amine such as monomethanolamine, monoethanolamine, diethanolamine, triethanolamine, and diisopropanolamine; or ammonia.

The basic material is preferably an alkali metal such as sodium, potassium and lithium, because the alkali metal is a strong electrolyte and thus can have an effect of accelerating the dissociation of the hydrophilic group.

The amount of the neutralized water-soluble resin is preferably at least 60%, and more preferably at least 80%, relative to the acid value of the copolymer.

One or more of these water-soluble resins may be used alone or in combination.

In the invention, the ink may also contain polyethyleneimine, a polyamine, polyvinylpyrrolidone, polyethylene glycol, a cellulose derivative such as methyl cellulose, ethyl cellulose and carboxyethyl cellulose, glucose, fructose, mannit, D-sorbit, a polysaccharide or a derivative thereof, such as dextran, xanthan gum, curdlan, cycloamylose, and maltitol, any other polymer emulsion, cyclodextrin, a macrocyclic amine, a dendrimer, a crown ether, urea or a derivative thereof, acetamide, or the like.

If necessary, the ink may also contain an antioxidant, an antifungal agent, an electroconductive agent, an ultraviolet absorbing agent, a chelating agent, or the like. Examples of the chelating agent include ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethyl glycine (DHEG), trans-1,2-cyclohexanediaminetetraacetic acid (CyDTA), diethylenetriamine-N,N,N',N',N'-pentaacetic acid (DTPA), and glycol ether diamine-N,N,N',N'-tetraacetic acid (GEDTA).

In addition, an electrolyte or a cationic substance may also be used as long as it does not cause a secondary failure. Examples of the electrolyte include alkali metal ions such as lithium ion, sodium ion and potassium ion, aluminum ion, barium ion, calcium ion, copper ion, iron ion, magnesium ion, manganese ion, nickel ion, tin ion, titanium ion, and zinc ion.

In the invention, the ink may also contain a surfactant or the like as a penetrating agent.

The surfactant may be any of nonionic, anionic, cationic, and amphoteric surfactants. Examples of the nonionic surfactant include polyoxyethylene nonylphenyl ether, polyoxyethylene octylphenyl ether, polyoxyethylene dodecylphenyl ether, polyoxyethylene alkyl ether, polyoxyethylene fatty acid ester, sorbitan fatty acid ester, polyoxyethylene sorbitan fatty acid ester, fatty acid alkylolamide, ethylene oxide adducts of acetylene alcohol, polyethylene glycol-polypropylene glycol block copolymer, polyoxyethylene ether of glycerin ester, and polyoxyethylene ether of sorbitol ester.

Examples of the anionic surfactant include alkylbenzene sulfonate, alkylphenyl sulfonate, alkylnaphthalene sulfonate, higher fatty acid salt, and sulfate and sulfonate of higher fatty acid ester, and higher alkylsulfosuccinate.

Examples of the cationic surfactant include tetraalkylammonium salts, alkylamine salts, benzalkonium salts, alkylpyridinium salts, and imidazolium salts. Specific examples thereof include dihydroxyethylstearylamine, 2-heptadecenyl-hydroxyethylimidazoline, lauryldimethylbenzylammonium chloride, cetylpyridinium chloride, and stearamide methyl pyridinium chloride.

Examples of the amphoteric surfactant include betaine, sulfobetaine, sulfate betaine, and imidazoline. Any other surfactant may also be used, such as a silicone surfactant such as a polysiloxane polyoxyethylene adduct, a fluoro-surfactant such as oxyethylene perfluoroalkyl ether, and a biosurfactant such as spiculisporic acid, rhamnolipid and lysolecithin.

One or more of these surfactants may be used alone or in combination. Based on the total mass of the ink, the content of the surfactant in the ink is preferably from 0.001 to 10% by mass in terms of the balance of surface tension and wettability.

In the invention, the ink preferably has a surface tension of approximately 20 to 60 mN/m.

Herein, the surface tension is a value that is measured in an environment of 23° C. and 55% RH using a Wilhelmy's surface tensiometer (manufactured by Kyowa Interface Science Co., Ltd.).

(Liquid Composition)

In the invention, the liquid composition contains a component for aggregating and/or thickening the ink. The liquid composition contains the water, the water-soluble organic solvent and the surfactant as basic components and contains a cationic substance that serves as the component for aggregating and/or thickening the ink. Examples of the cationic substance include a cationic surfactant, a cationic polymer and a multivalent metal salt.

In the invention, a method for exerting the aggregating or thickening action on the ink may include the step of making a difference between the pH of the ink and the pH of the liquid composition so that the colorant will be reduced in dispersibility and thus aggregated when the ink is brought into contact with the liquid composition. In the invention, the absolute value of the difference between the pH values of the ink and the liquid composition is particularly preferably 3.0 or more. In addition, if the liquid property changes from acidic to basic or from basic to acidic, the aggregating action can be more significant.

A pH-adjusting agent may be used to control the pH. The pH-adjusting agent may be selected widely from known pH adjusters, known electrolytes, known polymers and the like so that the absolute value of the pH difference between the ink and the liquid composition is set at 3.0.

Examples of such materials are shown below. Examples of the cationic surfactant include tetraalkylammonium salts, alkylamine salts, benzalkonium salts, alkylpyridinium salts, imidazolium salts, and derivatives thereof. Specific examples thereof include dihydroxyethylstearylamine, 2-heptadecenyl-hydroxyethylimidazoline, lauryldimethylbenzylammonium chloride, cetylpyridinium chloride, stearamide methyl pyridinium chloride, hexadecyltrimethylammonium chloride, hexadecyltrimethylammonium bromide, hexadecyldimethylamine hydrochloride, hexadecylpyridinium chloride, stearyl amine EO adduct hydrochloride, and distearyldimethylammonium chloride.

Examples of the cationic polymer include polyallylamine, polyaminesulfone, polyethyleneimine, polyvinylamine, polyalkylene polyamine, polyvinylimidazoline, chitosan, and complete or partial neutralization products thereof with an acid such as hydrochloric acid and acetic acid, diethylenetriamine polycondensation products, N,N-bisaminopropylethylenediamine, diallyldimethylammonium chloride-sulfur dioxide copolymer, and perfluoroalkylammonium chloride.

One or more of these cationic substances may be used alone or in combination. The content of the cationic substance used may be from 0.1 to 15% by mass, and preferably from 0.5 to 10% by mass.

An alternative method may include the step of adding, to the liquid composition, at least one ion selected from the group consisting of a metal cation, an ammonium ion and an organic ammonium ion so that the colorant will be reduced in dispersibility and thus aggregated when the ink is brought into contact with the liquid composition.

In particular, a multivalent metal cation is an effective material, because it can have a high mobility when the ink is brought into contact with the liquid composition. An ion of an element in Group 2, 3, 12, or 13 of the periodic table is an effective multivalent metal cation. The metal ion with a valence of 2 or more, such as magnesium ion, calcium ion, and aluminum ion, is particularly effective, because such a metal ion can crosslink the ionic functional groups of the colorant to produce a three dimensionally-crosslinking aggregation action.

Such a multivalent metal cation may be produced by the addition of any of general water-soluble salts. One or more of the multivalent metal salts may be used alone or in combination.

According to the invention, the liquid composition may contain at least one of a water-soluble polymer, a water-soluble oligomer, a resin emulsion, and an inorganic oxide.

Examples of the resin emulsion include an acrylic resin, a vinyl acetate resin, a styrene-butadiene resin, an acryl-styrene resin, a polybutadiene resin, a polystyrene resin, a polyurethane resin, a polyolefin resin, a polyester resin, a polyamide resin, a melamine resin, a urea resin, a silicone resin, a fluororesin, a polybutene resin, and various kinds of waxes.

Examples of commercially available resin emulsions include, but are not limited to, Bon Coat 4001 (an acrylic resin emulsion manufactured by Dainippon Ink and Chemicals, Incorporated), Bon Coat 5454 (a styrene-acrylic resin emulsion manufactured by Dainippon Ink and Chemicals, Incorporated), and J-74J and J-734 (manufactured by Johnson Polymer).

The resin emulsion may be prepared by mechanical pulverization or dispersion of the resin or wax in an aqueous medium or by direct polymerization such as emulsion polymerization, dispersion polymerization or suspension polymerization, which forms fine particles. In the invention, such a resin is preferably a polymer having both a hydrophilic moiety and a hydrophobic moiety. The particles may have a spherical shape or any other shape. The emulsion polymerization may be performed using an emulsifier or in a soap-free manner.

The inorganic oxide may be, but not limited to, a high-molecular weight silicic acid anhydride ($SiO_2$) or alumina ($Al_2O_3$).

The volume average particle diameter of the resin emulsion or the inorganic oxide colloid is preferably from 10 nm to 2 µm, and more preferably from 50 to 500 nm. A volume average particle diameter of more than 2 µm can easily cause a problem with the discharge stability of the liquid composition or the stability of the liquid composition during a standing time. A volume average particle diameter of less than 10 nm can easily cause a problem with the standing recoverability of the nozzle.

The content of the resin emulsion in the liquid composition is preferably from 0.1% by mass to 10% by mass in terms of solid content. If less than 0.1% by mass, the print sometimes cannot have improved fixation properties and can sometimes have a reduced density. If it is added in an amount of more than 10% by mass, a reduction in discharge stability or degradation in drying characteristics of the image can be observed.

The liquid composition may be used in the form of a colorless transparent liquid for treatment or in the form of color ink containing a colorant. In the latter case, the liquid composition preferably further contains a colorant as shown above. Such a colorant in the liquid composition is preferably a pigment as in the case of the ink.

In the case that the colorant is contained in the liquid composition, the content of the colorant is preferably from 1 to 15% by mass, more preferably from 2 to 10% by mass, based on the total mass of the liquid composition.

The liquid composition according to the invention preferably has a surface tension of approximately 20 to 40 mN/m. In such a range, the image drying time can be short, and the image quality effect can be achieved at the same time.

The surface tension is measured in an environment of 23° C. and 55% RH using the Wilhelmy's surface tensiometer as shown above.

The ink jet recording method of the invention is described in more detail below.

As described below, the ink jet recording method of the invention is performed using a general ink jet-type recording apparatus. In this case, the mass of one drop of each of the ink and the liquid composition is generally preferably from 0.5 to 80 ng. If the mass of one drop of the liquid is from 0.5 to 40 ng, improvement in both image quality and drying properties can easily be achieved particularly on a sheet of regular paper.

If one nozzle is capable of ejecting different volumes of drops in the ink jet-type recording apparatus, the amount of one drop refers to the amount of a printable minimum drop.

When the ink and the liquid composition are applied to the recording material, they are printed so as to be brought into contact with each other on the surface of the recording material. This is because the contact between the ink and the liquid composition causes aggregation of the colorant of the ink so that the recording method can provide good optical density, loss of color-edge definition resistance, loss of color-edge definition resistance between colors, or drying time. As long as they are in contact with each other, they may be applied so as to be adjacent to each other or so as to be overlapped or overlaid with each other.

After one of the ink and the liquid composition is applied, the other may be applied at any time. The time interval between the applications of the ink and the liquid composition to the recording material is preferably less than 20 msec, more preferably less than 15 msec. The lower limit of the time interval may be about 2 msec.

If the time interval is more than 20 msec, the effect of improving image quality can sometimes be reduced in the process of bidirectional printing.

The surface tension of each of the ink and the liquid composition is preferably in the above range. As a preferable embodiment of the invention, the surface tension γa of the ink may be in a range of approximately 20 to 60 mN/m, the surface tension γb of the liquid composition may be in a range of approximately 20 to 40 mN/m, γa and γb may have the relation γa>γb, and the time for drying the image may be at most about 2 seconds when the ink and the liquid composition are applied and brought into contact with each other on the recording material to form the image.

Improvement in both image quality and drying properties can be achieved when the relation between the surface tensions of the ink and the liquid composition is defined as shown above and when the time for drying the image is at most a specific time period. The time for drying the image may be determined by the method as described below and is more preferably at most one second.

The surface tension γa of the ink is more preferably in a range of approximately 30 to 50 mN/m, and the surface tension γb of the liquid composition is more preferably in a range of approximately 25 to 35 mN/m. If γa or γb is less than 20 mN/m, the image may be reduced in optical density. If γa is more than 60 mN/m or γb is more than 40 mN/m, drying properties may be degraded.

In a preferred embodiment of the invention, a piezo-ink jet recording system is employed, so that the amount of a drop of each of the ink and the liquid composition can be appropriately controlled in the printing process.

For example, the recording material used in the invention is preferably commercially available PPC paper or the like.

<Ink Jet Recording Apparatus>

A preferred embodiment of the ink jet recording apparatus according to the invention is described in detail below, which should not be construed to limit the scope of the invention.

The ink jet recording apparatus of the invention is configured so as to work and form an image based on the above-described ink jet recording method of the invention. The ink jet recording apparatus is mainly composed of an outer cover, a tray capable of holding a specific amount of a recording medium such as sheets of regular paper, a transfer roller (transfer means) for transferring each piece of the recording material to an inner part of the recording apparatus, and an image-forming unit (image-forming means) which discharges the ink and the liquid composition to the surface of the recording material to form an image.

The transfer roller comprises a pair of rollers which are rotatably provided in the recording apparatus and hold therebetween the recording medium placed on the tray and transfer a specific amount of the recording medium piece by piece at a specific timing to the inner part of the apparatus.

The image-forming unit forms an image from ink on the surface of the recording medium. The image-forming unit is mainly composed of a recording head, ink tanks, power supply cables, a carriage, a guide rod, a timing belt, a driving pulley, and a maintenance unit.

The ink tanks dischargeably contain the ink and the liquid composition, respectively.

The power supply cables and the ink tanks are connected to the recording head. When image recording information is input from the outside through the power supply cables to the recording head, the recording head sucks a specific amount of ink from each ink tank and discharges it to the surface of the recording medium based on the image recording information. The power supply cables serve to supply, to the recording head, not only the image recording information but also the power necessary for driving the recording head.

The recording head is placed and held on the carriage, to which the timing belt is connected. The timing belt is connected to the guide rod and the driving pulley. In such a structure, the recording head is kept parallel to the surface of the recording medium along the guide rod and is capable of moving in a direction Y (the main running direction) perpendicular to the transferring direction X of the recording medium (the sub running direction).

The recording apparatus further comprises control means that controls the timing of the recording head driving and the timing of the carriage driving based on the image recording information. Based on the image forming information, therefore, an image can continuously be formed on a specific region of the surface of the recording medium which is transferred at a specific speed along the transferring direction X.

The maintenance unit is connected to a pressure-reducing unit via a tube. The maintenance unit is also connected to the nozzle part of the recording head and has the functions of reducing the pressure inside the nozzle and sucking ink from the nozzle. If desired, the maintenance unit can remove unnecessary ink from the nozzle during the operation of the recording apparatus or suppress the evaporation of the ink from the nozzle when the operation is stopped. It should be noted that a first liquid and a second liquid are mixed to form an aggregate and that the maintenance unit should preferably be configured to hold the first liquid and the second liquid separately.

EXAMPLES

The present invention is more specifically described by means of the examples below. However, the following examples should not be construed to limit the scope of the invention.

<Preparation of Ink Set for Ink Jet Recording>

According to the specific formulation, the colorant solution, the aqueous organic solvent, the surfactant, and the ion exchange water, and other components if any are added in appropriate amounts, mixed and stirred. The resulting liquid is allowed to pass through a 5 μm filter to give each desired liquid.

(Ink Set 1 for Ink jet)

-Ink (Black Ink)-

| | |
|---|---|
| Cabojet-300 (carbon black manufactured by Cabot Corporation) | 5% by mass (pigment content) |
| Styrene-acrylic acid-potassium acrylate copolymer | 1.0% by mass |
| Diethylene glycol | 20% by mass |
| Propylene glycol | 5% by mass |
| Surfynol 104 (a nonionic surfactant manufactured by Nisshin Chemicals Co., Ltd.) | 0.1% by mass |

-continued

| (Ink Set 1 for Ink jet) | |
|---|---|
| Urea | 4% by mass |
| Ultrapure water | 64.4% by mass |
| -Liquid Composition (Cyan Ink)- | |
| Water-soluble dye (C.I. Direst Blue-199) | 3.5% by mass |
| Diethylene glycol | 20% by mass |
| 2-pyrrolidone | 6% by mass |
| Surfynol 465 (a nonionic surfactant manufactured by Nisshin Chemicals Co., Ltd.) | 1.0% by mass |
| Magnesium nitrate 6-hydrate | 4% by mass |
| Ultrapure water | 71.5% by mass |

The ink has a surface tension of 34.0 mN/m and a viscosity of 2.8 mPa·s, and the liquid composition has a surface tension of 31.2 mN/m and a viscosity of 2.5 mPa·s.

| (Ink Set 2 for Ink jet) | |
|---|---|
| -Ink (Cyan Ink)- | |
| Cyan pigment (C.I. Pigment Blue 15:3) | 3.5% by mass |
| Glycerol | 20% by mass |
| 2-pyrrolidone | 3% by mass |
| Surfynol (a nonionic surfactant manufactured by Nisshin Chemicals Co., Ltd.) | 1.0% by mass |
| Styrene-methacrylic acid-sodium methacrylate copolymer | 0.5% by mass |
| Ultrapure water | 72% by mass |
| -Liquid Composition (Colorless Reactive Liquid)- | |
| Diethylene glycol | 10% by mass |
| Propylene glycol | 10% by mass |
| Surfynol 465 (a nonionic surfactant manufactured by Nisshin Chemicals Co., Ltd.) | 1.2% by mass |
| Magnesium nitrate 6-hydrate | 5% by mass |
| Ultrapure water | 73.8% by mass |

The ink has a surface tension of 32.3 mN/m and a viscosity of 2.7 mPa·s, and the liquid composition has a surface tension of 30.6 mN/m and a viscosity of 2.2 mPa·s.

<Printing Conditions>

Printing is performed using a thermal ink jet recording apparatus designed for evaluation purposes, in which two prototype ink jet printing heads (each 600 dpi, 256 nozzles), one for the ink and one for the liquid composition are arranged to move or "scan" bidirectionally. The recording material used is FX-L paper (manufactured by Fuji Xerox Co., Ltd.) or the like. The discharge amount and the amount of ink application are regulated according to each of the examples and comparative examples shown below. Batch printing in one direction is performed at a head-movement speed of about 0.5 m/s. The sequence of performing either the ink printing or the liquid composition printing first or last (first application and later application) is controllable, and the time interval between both applications on the recording material is set at 10 ms. Unless otherwise stated below, printing is performed under normal conditions (at a temperature of 23±0.5° C. and a humidity of 55±5% RH), and image evaluation is performed on a print sample that is allowed to stand under the described normal conditions for 24 hours after the printing process.

Examples 1 and 2 and Comparative Examples 1 to 3

Ink set 1 for ink jet is used. The ink is applied first and the liquid composition later when the heads move or "scan" in the forward direction, and the liquid composition is applied first and the ink later when the heads move in the backward direction. Printing is performed to form a black 100% image using the amount of the ink application per one drop as shown in Table 1, and the evaluation is performed as shown below.

-Image Uniformity (Mottling)-

A filled-in image of 2 cm×10 cm is printed on regular FX-L paper (manufactured by Fuji Xerox Co., Ltd.) or 4024 paper (manufactured by Xerox Corporation) and then organoleptically evaluated for the presence or absence of color unevenness according to the following criteria:

◯: no unevenness of color
X: some unevenness of color

-Drying Properties-

A filled-in image of 2 cm×10 cm is printed on regular FX-L paper (manufactured by Fuji Xerox Co., Ltd.). At regular time intervals after printing, another sheet of FX-L paper is placed over the printed image, a load of 100 g/cm$^2$ is applied thereto, and the time period required for ink to no longer transfer to the overlaid sheet of paper (drying time) is determined. The evaluation is performed according to the following criteria:

◯: less than 2 seconds after printing
X: at least 2 seconds after printing

The results are shown in Table 1.

TABLE 1

| | Amount of Applied Ink (ng/one drop) | | | | Results of Evaluation | | | |
|---|---|---|---|---|---|---|---|---|
| | Forward Scanning | | Backward Scanning | | Forward Scanning | | Backward Scanning | |
| | Ink (Applied First) | Liquid Composition (Applied Later) | Ink (Applied Later) | Liquid Composition (Applied First) | Mottling | Drying Property | Mottling | Drying Property |
| Example 1 | 20 | 6 | 20 | 4 | ◯ | ◯ | ◯ | ◯ |
| Example 2 | 20 | 6 | 18 | 4 | ◯ | ◯ | ◯ | ◯ |
| Comparative Example 1 | 20 | 6 | 20 | 6 | ◯ | ◯ | X | ◯ |
| Comparative Example 2 | 20 | 4 | 20 | 4 | ◯ | X | ◯ | ◯ |
| Comparative Example 3 | 20 | 4 | 20 | 8 | ◯ | ◯ | X | ◯ |

Examples 3 and 4 and Comparative Examples 4 to 6

Ink set 1 for ink jet is used. The ink is applied first and the liquid composition later when the heads move or "scan" in the forward direction, and the liquid composition is applied first and the ink later when the heads move in the backward direction. Printing is performed to form a black 100% image with the amount of the ink application per one drop fixed at 20 ng at a resolution of 600×600 dpi with the respective area coverage values (%) of the ink and the liquid composition as shown in Table 2, and the evaluation is performed as described above.

The area coverage values 100%, 90%, 30%, 25%, and 20% correspond to the following amounts of the ink applied per unit area: 11.2 g/m$^2$, 10.0 g/m$^2$, 3.3 g/m$^2$, 2.8 g/m$^2$, and 2.2 g/m$^2$, respectively.

The results are shown in Table 2.

TABLE 2

| | Amount of Applied Ink (Area Coverage: %) | | | | Results of Evaluation | | | |
|---|---|---|---|---|---|---|---|---|
| | Forward Scanning | | Backward Scanning | | Forward Scanning | | Backward Scanning | |
| | Ink (Applied First) | Liquid Composition (Applied Later) | Ink (Applied Later) | Liquid Composition (Applied First) | Mottling | Drying Property | Mottling | Drying Property |
| Example 3 | 100 | 25 | 100 | 20 | ○ | ○ | ○ | ○ |
| Example 4 | 100 | 25 | 90 | 20 | ○ | ○ | ○ | ○ |
| Comparative Example 4 | 100 | 25 | 100 | 25 | ○ | ○ | X | ○ |
| Comparative Example 5 | 100 | 20 | 100 | 20 | ○ | X | ○ | ○ |
| Comparative Example 6 | 100 | 25 | 100 | 30 | ○ | ○ | X | ○ |

Examples 5 and 6 and Comparative Examples 7 to 9

Ink set 2 for ink jet is used. The ink is applied first and the liquid composition later when the heads move or "scan" in the forward direction, and the liquid composition is applied first and the ink later when the heads move in the backward direction. Printing is performed to form a cyan 100% image using the amount of the ink application per one drop as shown in Table 3, and the evaluation is performed as described above.

The results are shown in Table 3.

TABLE 3

| | Amount of Applied Ink (ng/one drop) | | | | Results of Evaluation | | | |
|---|---|---|---|---|---|---|---|---|
| | Forward Scanning | | Backward Scanning | | Forward Scanning | | Backward Scanning | |
| | Ink (Applied First) | Liquid Composition (Applied Later) | Ink (Applied Later) | Liquid Composition (Applied First) | Mottling | Drying Property | Mottling | Drying Property |
| Example 5 | 20 | 6 | 20 | 4 | ○ | ○ | ○ | ○ |
| Example 6 | 20 | 6 | 18 | 4 | ○ | ○ | ○ | ○ |
| Comparative Example 7 | 20 | 6 | 20 | 6 | ○ | ○ | X | ○ |
| Comparative Example 8 | 20 | 4 | 20 | 4 | ○ | X | ○ | ○ |
| Comparative Example 9 | 20 | 6 | 20 | 8 | ○ | ○ | X | ○ |

Examples 7 and 8 and Comparative Examples 10 to 12

Ink set 2 for ink jet is used. The ink is applied first and the liquid composition later when the heads move or "scan" in the forward direction, and the liquid composition is applied first and the ink later when the heads move in the backward direction. Printing is performed to form a cyan 100% image with the amount of the ink application per one drop fixed at 20 ng and with the respective area coverage values (%) of the ink and the liquid composition as shown in Table 4, and the evaluation is performed as described above.

The results are shown in Table 4.

TABLE 4

| | Amount of Applied Ink (Area Coverage: %) | | | | Results of Evaluation | | | |
| | Forward Scanning | | Backward Scanning | | Forward Scanning | | Backward Scanning | |
| | Ink (Applied First) | Liquid Composition (Applied Later) | Ink (Applied Later) | Liquid Composition (Applied First) | Mottling | Drying Property | Mottling | Drying Property |
|---|---|---|---|---|---|---|---|---|
| Example 7 | 100 | 25 | 100 | 20 | ○ | ○ | ○ | ○ |
| Example 8 | 100 | 25 | 90 | 20 | ○ | ○ | ○ | ○ |
| Comparative Example 10 | 100 | 25 | 100 | 25 | ○ | ○ | X | ○ |
| Comparative Example 11 | 100 | 20 | 100 | 20 | ○ | X | ○ | ○ |
| Comparative Example 12 | 100 | 25 | 100 | 30 | ○ | ○ | X | ○ |

Tables 1 to 4 indicate that the examples, which satisfy the conditions according to the invention with respect to the amounts of the ink and the liquid composition applied sequentially, show good printing properties in terms of both mottling and drying properties.

What is claimed is:

1. An ink jet recording method utilizing an ink set for ink jet recording which comprises at least two types of liquids including an ink that comprises at least a colorant, and a liquid composition that comprises at least a component for aggregating and/or thickening the ink, the method comprising applying the ink and the liquid composition to a recording material to bring the ink and the liquid composition into contact with each other whereby an image is formed, wherein the relation represented by the following formula (2) is satisfied:

$$b_{d2}/a_{d2} < b_{d1}/a_{d1} \quad \text{Formula (2)}$$

wherein $a_{d1}$ and $b_{d1}$ represent the respective amounts of the ink and the liquid composition applied per one drop, when the ink is applied to the recording material before the liquid composition is applied;

$a_{d2}$ and $b_{d2}$ represent the respective amounts of the ink and the liquid composition applied per one drop, when the liquid composition is applied to the recording material before the ink is applied; and $a_{d1}$ and $b_{d1}$ satisfy the relation $a_{d1} > b_{d1}$ and $a_{d2}$ and $b_{d2}$ satisfy the relation $a_{d2} > b_{d2}$.

2. The ink jet recording method of claim 1, wherein
the ink has a surface tension γa in a range of approximately 20 to 60 mN/m,
the liquid composition has a surface tension γb in a range of approximately 20 to 40 mN/m, γa and γb satisfy the relation γa>γb, and the image formed by applying the ink and the liquid composition to the recording material to bring the ink and the liquid composition into contact with each other dries in at most about 2 seconds.

3. The ink jet recording method of claim 1, wherein the colorant of the ink comprises at least one pigment.

4. The ink jet recording method of claim 1, wherein there is a time interval of less than approximately 20 milliseconds between the applying of the ink to the recording material and the applying of the liquid composition to the recording material.

5. An ink jet recording apparatus comprising a recording head for discharging liquids of an ink set for ink jet recording, the ink set comprising at least two types of liquids including an ink that comprises at least a colorant, and a liquid composition that comprises at least a component for aggregating and/or thickening the ink, wherein the apparatus applies the ink and the liquid composition to a recording material to bring the ink and the liquid composition into contact with each other whereby an image is formed, and the relation represented by the following formula (2) is satisfied:

$$b_{d2}/a_{d2} < b_{d1}/a_{d1} \quad \text{Formula (2)}$$

wherein $a_{d1}$ and $b_{d1}$ represent the respective amounts of the ink and the liquid composition applied per one drop, when the ink is applied to the recording material before the liquid composition is applied;

$a_{d2}$ and $b_{d2}$ represent the respective amounts of the ink and the liquid composition applied per one drop, when the liquid composition is applied to the recording material before the ink is applied; and $a_{d1}$ and $b_{d1}$ satisfy the relation $a_{d1} > b_{d1}$ and $a_{d2}$ and $b_{d2}$ satisfy the relation $a_{d2} > b_{d2}$.

6. The ink jet recording apparatus of claim 5,
wherein
the ink has a surface tension γa in a range of approximately 20 to 60 mN/m,
the liquid composition has a surface tension γb in a range of approximately 20 to 40 mN/m, γa and γb satisfy the relation γa>γb, and
the image formed by applying the ink and the liquid composition to the recording material to bring the ink and the liquid composition into contact with each other dries in at most about 2 seconds.

7. The ink jet recording apparatus of claim 5, wherein the colorant of the ink comprises at least one pigment.

8. The ink jet recording apparatus of claim 5, wherein there is a time interval of less than approximately 20 milliseconds between the applying of the ink to the recording material and the applying of the liquid composition to the recording material.

* * * * *